April 18, 1967  A. DAVIS, JR  3,314,205
SYNTHETIC ELASTOMERIC COATED ROOF SURFACE
AND METHODS OF APPLYING IT
Filed May 23, 1963
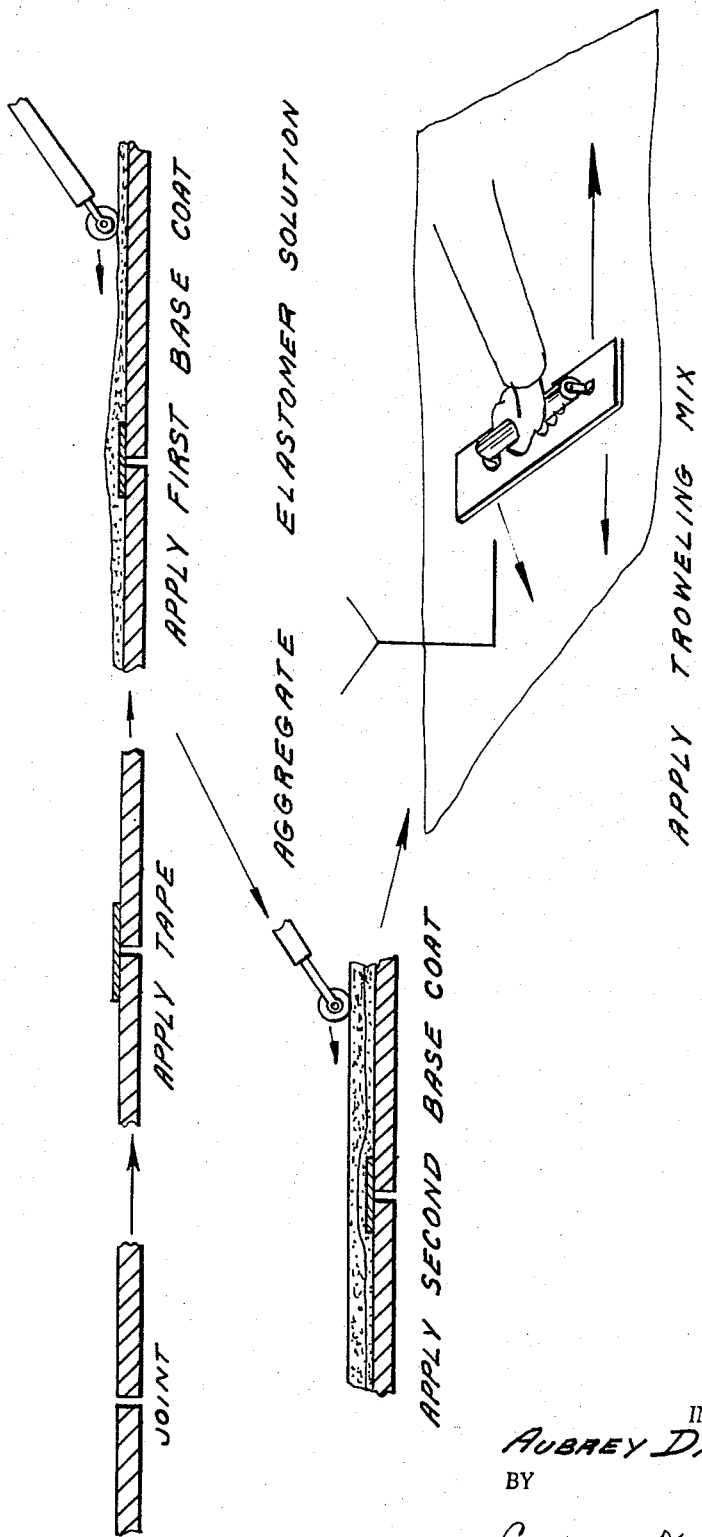
INVENTOR.
AUBREY DAVIS, JR
BY
Cushman, Darby & Cushman
ATTORNEYS

3,314,205
SYNTHETIC ELASTOMERIC COATED ROOF SURFACE AND METHODS OF APPLYING IT
Aubrey Davis, Jr., Mercer Island, Wash., assignor to Gaco Western, Inc., Seattle, Wash., a corporation of Washington
Filed May 23, 1963, Ser. No. 282,684
10 Claims. (Cl. 52—309)

The present invention relates to a waterproof and wear resistant surface for a roof and to a method of manufacturing it. The surface contains a balanced composition of water proofing material and specially selected compatible abrasion resistant aggregate.

Conventional roofing materials are principally designed to insulate building members from deteriorating weather conditions such as rain and strong sun, and a wide variety of highly efficient surfacing materials have been made available for these purposes. However, these are not generally suitable as walking surfaces, particularly because of the ease of damage, lack of abrasion resistance and their tendency to soften under heat.

It is also known to render surfaces abrasion resistant by adhering to them abrasive particles such as sand. Generally a hardenable, tacky substance is applied to the surface and abrasive particles, e.g., sand granules, are distributed on the tacky substance before it sets. The results of this procedure are not generally satisfactory, since the abrasive is not distributed uniformly and will settle in the tacky substance in a non-uniform manner. Accordingly, there has been a need for a more satisfactory abrasion-resistant roof surfacing material.

The present invention is based upon the discoveries that there is a critical relationship between the wear resisting aggregate particles and the water proofing materials which must be observed, that the sub-surface to which the roofing materials are applied must be prepared in a particular manner, and that there is a critical manner in which the aggregate must be applied to the surface. By observing these elements of the invention, it is possible to produce a highly satisfactory surface which is wear resistant and weather-proof and which preserves these properties for long periods of time. The basic elements of the invention may be seen from the flow diagram in the drawing. A series of layers are applied to a sub-surface, one above the other, each being allowed to harden in sequence before the next is applied. First, a primer or sealer coat is applied. This is a thin solution of a synthetic elastomer which seals the pores of the sub-floor. Next, any joints between adjacent sub-flooring sections must be sealed by a flexible sheet material or tape adhered to the surfaces of adjoining sections, near their edges. This tape serves to distribute in the surfacing layers which lie above it any stresses which develop at the joint. Then at least two base coats of synthetic elastomer solution are applied, followed by a troweling mix of elastomer and aggregate or abrasive. Optionally, additional elastomer layers may be applied over this in certain special cases.

The elastomer which is used is a synthetic elastomer which has superior weather resisting properties. It should not become brittle or crack when exposed to the elements for long periods of time and it must be moderately extensible and resilient. It also must have reasonably high tensile strength, and should not be too resilient as a hard, wear-resistant walking surface resistant to indentation is desired. A number of synthetic materials already available are generally suitable such as neoprene, chlorosulfonated polyethylene, polyurethane rubbers, relatively hard grades of butyl rubber, silicone rubbers and polysulfide rubbers. Certain plasticized vinyl resins have the proper physical characteristics but are difficult to dissolve in ordinary solvents and, consequently, are less desirable. However, of the above elastomers, neoprene is the most suitable. Chlorosulfonated polyethylene is also preferred to the other elastomers, particularly for its ability to withstand weathering, although its tensile strength is somewhat less satisfactory than is neoprene's.

The elastomer may be blended with certain resinous modifiers, pigments, fillers, curing agents, and similar materials. For example, a typical resinous modifier is a phenolic resin which tends to improve adhesion and promote cure. However, any such materials which are used should not have a tendency to separate from the elastomer and should be weather resistant.

In applying the coatings, the elastomer is dissolved in an organic solvent. Any solvent or solvent blend which dissolves the elastomer may be considered, the choice depending on the nature of the elastomer, application properties of the resulting solution and rate of evaporation to give suitable drying time. For example, when using neoprene or chlorosulfonated polyethylene, the solvent may be xylol. Mixtures of solvents may also be used. However, in general, caution should be used wherever possible in selecting solvents to avoid, where possible, highly toxic solvents and others which create unnecessary hazards, particularly where the coatings are applied manually.

In general, the amount of elastomer dissolved in the solvent for the base coats and troweling mix will be 15 to 20% to give a viscosity of 3000 to 9500 cps. at 70° F. for neoprene. The viscosity range of a typical chlorosulfonated polyethylene solution is about 600 to 1500 cps. at 70° F. The specific gravity is usually about 0.9–1.1. A thinner solution of about 20 to 100 cps. is used for the primer coat, in which case it is also possible to use, as the elastomer, chlorinated rubber.

The aggregate used in the troweling mix must be lightweight and should have a specific gravity approximately the same as the elastomer solution. Accordingly, the most satisfactory materials are the hard portions of plant seeds such as the shells of walnuts, filberts, pecans, butternuts and hickory nuts. It is also possible to use the hard outer coating of the fruit of the Brazil nut tree and the hard portions of coconuts, peach pits, apricot pits, cherry pits, and the like. However, soft nut shells such as peanut shells, almond shells, and cotton seed hulls are not as satisfactory. The shells and similar materials used have specific gravities of about 0.8 to 1.6 and, of these, the preferred materials have a specific gravity of about 1.0 to about 1.5. In the case of neoprene and chlorosulfonated polyethylene, walnut shells and filbert shells have been found particularly satisfactory. The solutions of these elastomers which are used have specific gravities of about 1.0–1.1 which compare with a specific gravity of 1.3–1.4 for most of the above nut shells. Hence, the aggregate has almost the same or slightly higher specific gravity as compared to the elastomer solution.

These materials should not be softened or adversely affected by the solvents used and should not be fragile. The particles of aggregate should be of approximately uniform size and are preferably about 12 to 80 mesh U.S. Standard Sieve series. Since nut shells may be used, it should be noted that the particles should be dust free, and granular rather than fibrous or lamellated, i.e., from a central point they should have approximately the same dimensions in all directions. Long, flat particles are not suitable. In addition, the particles, as noted above, should not be fragile.

However, it has been found that heavy inorganic granules such as sand and gravel are not suitable. They tend to settle out unevenly from the troweling mixture, both before and after it is applied. A satisfactory relationship between elastomer and elastomer solution prevents settling for two or three hours. The troweling mixture, after being applied, will stiffen sufficiently rapidly that the aggregate need not be suspended longer.

The troweling mixture contains a thick, viscous solution of elastomer, slightly heavier bodied than paint but still sufficiently fluid to work easily, and granules of aggregate distributed in it. The elastomer solution should not be too thin, since, otherwise, the granules would settle out and could not be uniformly distributed on the roof. Similarly, the solution should not be so viscous that the troweling mixture would be difficult to apply or that excessive difficulty would be encountered in dispersing the granules in it. Generally, the viscosity will be about the same as in the base coats, in the range of 3000–9500 cps. at 70° F. The amount of aggregate is about 2.5 to 5.0 lbs. for each gallon of elastomer solution with about 4.0 lbs. the preferred amount. The amount varies with the size of granule and the texture desired.

Pigments may be added to the elastomer solutions and troweling mixture to provide desirable color effects. In general there is no limitation on the selection of pigment other than the obvious requirements of light fastness, effect on viscosity of the solution and lack of tendency to separate from the roofing coatings. Inorganic pigments such as carbon black are preferred, in amounts, usually, of about 60 to 120% of the elastomers by weight. Although organic coloring materials are useful, the inorganics tend to have greater light fastness and usually provide suitably dull colors which are preferred under foot. In addition, some pigments may have a tendency to thicken the solution or accelerate curing of the elastomer, and these should be avoided, or compensated, e.g., by using less curing agent. However, use of readily available data and routine testing will enable selection of suitable pigments without difficulty.

The following examples are illustrative.

*Example I*

A stock solution is formed of:

| | | |
|---|---|---|
| Neoprene [1] | lbs | 100 |
| Phenolic resin | lbs | 40 |
| Xylene | gal | 53 |
| Antioxidant for neoprene | lbs | 2 |
| Metallic oxides [2] | lbs | 9 |
| Pigment | lbs | 100 |

[1] Specific gravity 1.23, having moderate to high rate of crystallization and containing no discoloring additives.
[2] Zinc and magnesium oxide.

This was used as a base coating. A primer coating was made by adding 2 gallons of xylene for each gallon of the stock solution and a troweling mixture was prepared by adding 4 lbs. of walnut shell granules about 30 mesh to 1 gallon of stock solution.

*Example II*

An elastomer stock solution was prepared containing:

| | | |
|---|---|---|
| Chlorosulfonated polyethylene [3] | lbs | 100 |
| Chlorinated rubber | lbs | 20 |
| Tribasic lead maleate | lbs | 40 |
| Pigments | lbs | 100 |
| Accelerators (added at time of use) | lbs | 8 |
| Alcohol | lbs | 25 |
| Xylol | gal | 40 |

[3] Specific gravity 1.28—Hypalon 30, specific gravity may be 1.12–1.28 generally.

This was used in a similar manner and gave a very satisfactory result.

In applying the roofing material, a primer or sealer coat is applied, first, to penetrate and seal open pores. This may be applied with a brush or roller. Joints between sections of sub-flooring such as concrete slabs, plywood sheets, etc., are next sealed. Generally, non-shrinking elastomer or other caulking material is pressed into cracks between the adjoining sections to make the surface flush, and then a tape is applied. A variety of taping materials will satsifactorily seal joints between adjacent sub-floor sections. Ordinary pressure-sensitive cotton fabric or flexible elastomer-backed tape may be used. It is also possible to apply a layer of elastomer solution at the edges of the joint and press to it a strip of thin elastomer sheet previously coated with elastomeric contact adhesive, when both surfaces are dry, to form a secure seal. Yet another tape which may be used is a mat or woven fabric of glass or other fibers. This may be pressed into elastomer solution, or it may be set in position and elastomer solution brushed through it. Other flexible sheet materials may be used.

Then, after the tapes are in place, a first base coat of stock solution is brushed or rolled over the primer and tapes. This dries and hardens by evaporation of solvent and at least partial curing of the elastomer itself. Then, one or more additional base coat layers may be applied, allowing drying between coats. In general, each base coat will be about 6 to 8 mils thick. Finally, the troweling mixture is laid down, and is worked back and forth and into the underlying base coats. Careful working is necessary to assure adequate smoothness and freedom from entrapped air.

An overcoat of stock solution may be applied over the troweling mixture, after it has dried. This may be desirable for certain color effects or where improved weather resistance is desirable. For example, chlorosulfonated polyethylene has superior weather resistance to neoprene, but is not as suitable in other respects. Hence, base coats and a troweling mixture containing neoprene may be used, followed by an overcoat of chlorosulfonated polyethylene, to take advantage of the best properties of both materials.

The resultant roof surface is waterproof and weather and abrasion resistant. Specimens which have been tested in pedestrian and automobile traffic areas, such as walkways, children's play areas and automobile parking areas, have shown superior durability and have retained their waterproofing properties after prolonged use. Consequently the system is highly useful for decks and the like which overlie building structures and must combine these properties.

In some cases, the troweling mixture has been applied directly over a thin base or primer coat, followed by additional coats. However, the results are not generally considered as satisfactory as those described above.

The invention has been described with reference to preferred embodiments. However, it should be understood that various changes of details may be made in selection of materials or mode of operation without departing from the scope of the invention, as this is defined in the claims.

What is claimed is:

1. A method of applying a textured wear resistant surface to a roof which comprises
   spreading thereon a troweling mixture of (1) a thick, viscous solution of a synthetic, weather-resistant elastomer and (2) substantially dust-free nonfibrous, nonlamellated, nonfragile granules about 12 to 80 mesh and composed of the hard portions of plant seeds having a specific gravity of about 0.8 to 1.6 and having about the same specific gravity as said solution;
   said troweling mixture thereafter hardening by evaporation of the solvent in said solution and at least partial curing of said elastomer.

2. A method of applying a wear resistant surface as set forth in claim 1 including the step of applying to said roof at least one layer of said solution of elastomer and permitting hardening of said layer by evaporating solvent and at least partially curing of said elastomer before applying said troweling mixture.

3. A method of applying a wear resistant surface to a roof as set forth in claim 2 wherein said roof has a plurality of sub-floor sections which meet at joints and including the steps of sealing the joints by adhering a flexible material to the surfaces of adjoining sub-floor sections adjacent the joint to distribute stress in overlying surfacing layers, before applying said layer of said solution of elastomer.

4. A method of applying a wear resistant surface as set forth in claim 3 in which said elastomer is neoprene.

5. A method of applying a wear resistant surface as set forth in claim 3 in which said elastomer is chlorosulfonated polyethylene.

6. A method of applying a wear resistant surface as set forth in claim 3 including applying at least one layer of solution of said elastomer over the hardened troweling mixture and hardening it by evaporating solvent and at least partially curing said elastomer.

7. A method of applying a wear resistant surface as set forth in claim 6 in which the elastomer in said troweling mixture is neoprene and the elastomer applied over the troweling mixture is chlorosulfonated polyethylene.

8. A method of applying a wear resistant surface as set forth in claim 3 in which said aggregate comprises walnut shell granules.

9. A method of applying a wear resistant surface as set forth in claim 3 in which said aggregate comprises filbert shell granules.

10. A roof surface manufactured by the method of claim 3.

References Cited by the Examiner

UNITED STATES PATENTS

| | | | |
|---|---|---|---|
| 1,960,252 | 5/1934 | Mano | 117—162 |
| 2,078,049 | 4/1937 | Benedict | 52—417 |
| 2,165,955 | 7/1939 | Haarhoff | 117—77 X |
| 2,175,096 | 10/1939 | Strauch | 260—9 |
| 2,672,793 | 3/1954 | Rowe | 94—3 |
| 2,771,824 | 11/1956 | Patch | 94—3 |
| 2,995,784 | 8/1961 | Driscoll | 156—71 X |

FOREIGN PATENTS 644,250     1962    Canada.

OTHER REFERENCES

American Roofer and Building Improvement Contractor, February 1963, pp. 20, 21, 22 and 27.

Pacific Plastics, August 1943, pp. 26 and 27.

FRANK L. ABBOTT, *Primary Examiner.*

JOHN E. MURTAUGH, *Examiner.*